United States Patent [19]
Frick et al.

[11] Patent Number: 5,353,096
[45] Date of Patent: Oct. 4, 1994

[54] GUIDE APPARATUS FOR COPY MASTERS

[75] Inventors: Beat Frick, Buchs; Wilhelm H. Koch, Otelfingen, both of Switzerland

[73] Assignee: Gretag Imaging, AG, Switzerland

[21] Appl. No.: 917,319

[22] Filed: Jul. 23, 1992

[30] Foreign Application Priority Data

Aug. 12, 1991 [DE] Fed. Rep. of Germany ..... 91810631

[51] Int. Cl.⁵ ............................................. G03B 27/52
[52] U.S. Cl. ........................................................ 355/41
[58] Field of Search ....................... 355/40, 41, 77, 75; 250/560, 571

[56] References Cited

U.S. PATENT DOCUMENTS

| | | |
|---|---|---|
| 1,383,357 | 7/1921 | Wescott . |
| 3,658,223 | 4/1972 | Bergly et al. ............................ 226/33 |
| 3,874,791 | 4/1975 | Thieme et al. ........................... 355/41 |
| 4,666,279 | 5/1987 | Fujita ..................................... 354/320 |
| 4,933,716 | 6/1990 | Imamura et al. ......................... 355/75 |
| 5,097,292 | 3/1992 | Hicks ..................................... 355/75 |
| 5,128,519 | 7/1992 | Tokuda ................................ 355/41 X |

FOREIGN PATENT DOCUMENTS 0331048 9/1989 European Pat. Off. .
2246066 3/1974 Fed. Rep. of Germany .

Primary Examiner—D. Rutledge
Attorney, Agent, or Firm—Burns, Doane, Swecker & Mathis

[57] ABSTRACT

In a guide apparatus for a copy master, guide elements are provided which define a transport plane of the copy master and which comprise lateral walls located essentially perpendicular to the plane of transport of the master and approximately parallel to the direction of copy master transport. The lateral walls guide the lateral edges of the copy master. A detector is further provided to detect the information applied near lateral edges of the copy master. The lateral walls of the guide apparatus are laterally adjustable in case of variations of the width of the copy master in the plane of transport.

13 Claims, 3 Drawing Sheets

GUIDE APPARATUS FOR COPY MASTERS

BACKGROUND OF INVENTION

The invention relates to a guide apparatus for copy masters.

Guiding devices of this type are already in use particularly in the automatic processing of photographic copy masters in printers. In such printers usually copy masters in the form of individual positive or negative film strips are initially spliced into a long strip of film. This strip is then conducted to a measuring station wherein it is measured. After measuring, the necessary quantities of copying light are determined and subsequently the desired image fields of the film strip are copied onto a photosensitive photographic copy material, for example photographic paper.

On the film strips spliced into a single strip of film, commercially available information concerning the corresponding image field, the type of film, etc. is present in the lateral edge zones or portions of the individual strips, which may be taken into consideration for example in the determination of the quantities of copy light required. Usually, the so-called DX code is applied. It contains information relative to the film product, the type of film and, in the case of many manufacturers, information concerning the image number. This information is present most often in the form of one or two track bar codes applied in the longitudinal direction of the film relative to a lateral edge zone of the film strip. Depending on the manufacturer, occasionally the image field number is also shown in the form of a bar code. Such bar codes in the case of commercial films include for example two tracks, a data track and a cycle track, which are formed purely externally of similar elements (bars). However, they have different functions and different combinations of the individual elements (bars). A measuring cycle is produced by means of the cycle track, whereby the mostly coded data of the data track can be read, the data track containing the information (data) proper in a coded form. To produce the cycle, the cycle track is exposed for example to red light, for example by means of red LED-s, and the transmitted light received on the other side of the film, for example by means of a photodiode, converts the optical signal received into an electric signal. By means of the transparent and non-transparent elements (bars) in the cycle track, the cycle is produced in this manner. The data of the data track are read in the same manner (exposure of the data track., measurement of the light received on the other side of the film). These data are then available as the input data for decoding.

Within the measuring station a defined lateral guidance of the film is required, as during the measurement of the image fields a definite position of the image field to be measured is necessary so that the measuring process may be carried out. The same is true for the reading of the data in the lateral edge zone or portion of the film strip. For this purpose, in known devices, the film strip or band is "forced" by guiding elements along a defined path. These guide elements comprise two stationary lateral walls extending approximately perpendicular to the transport plane of the film strip and parallel to the direction of transport. Between these lateral walls the film strip is guided by its lateral edges. In order to be able to read the bar code (DX code) in the lateral edge zone of the film strip, detection means are provided (for example LED-s and photodiodes, as set forth above).

This type of guidance (also called "hard" guidance) is usable in itself, but has certain disadvantages. For example, this type of guidance cannot react to variations in the width of the film strip to be processed. Such width variations may, for example, be due to manufacturing conditions (over or under dimensioning of the individual film strips). They may also be due to the splicing of several film strips into one long film strip. Excessive widths may be caused, for example, by the excessive width of the splice itself, but also by inaccuracies in the splicing of the film strip. For example, two film strips may be spliced together slightly offset relative to each other or they may be spliced at a slight offset angle to each other. In both cases, this results in variations of the width of the film strip produced by splicing.

This film strip is forced in the measuring station into the abovedescribed "hard" guide. This may lead, in the case of an excessive width (regardless of the cause) of the film strip, to problems in transportation, caused by the increased friction of the lateral edges of the film strip on the lateral walls. This may result on the one hand in a higher wear of the lateral walls by the film strip edges rubbing against them, and on the other hand, in damage to the film strip. In addition, impediments during transportation may cause appreciable fluctuations in synchronization during processing, which cannot be tolerated. Furthermore, the film strip may be bent in such areas of excessive width, so that the reading of the DX code or the measuring of the individual image fields become difficult or even impossible.

SUMMARY OF INVENTION

It is therefore one object of the invention to propose a guide whereby the aforecited disadvantages are eliminated, thereby making possible, in particular in the case of width fluctuations of the film strip, the guidance of the film strip without problems. Simultaneously, the DX code in the lateral edge zone of the film strip should be readable without difficulty.

According to the invention, lateral walls are laterally movable relative to the transport direction of the master in the transport plane. In this manner, the guide is able to react to variations in the width of the master in the form of the film strip, regardless of the cause of the fluctuations and render the guidance of the film strip without difficulty possible, so that the increased wear of the lateral walls and film strip edges may be avoided. Furthermore, unacceptable fluctuations of synchronization in the processing of the film strip are eliminated. At the same time, the DX code is clearly readable as any deformations of the film strip are prevented.

In an advantageous embodiment of the guide apparatus, the lateral walls are movable laterally against the resetting force of a spring. In particular, the lateral walls are fastened at one free end of a stationarily mounted plate spring or connected with this end. In this manner the lateral walls may be moved in a structurally simple manner which requires little mechanical effort. Additionally, it is highly reliable.

In a particularly convenient embodiment of the guide apparatus, the guide elements comprise in addition to the lateral wall, a support surface for each lateral portion of the copy master, with the lateral wall and the support surface being located approximately perpendicular to and connected with each other. In this simple manner, the defined guidance of the master may be carded out.

In this embodiment, an advantageous configuration of the detection means includes a light source which exposes to light the lateral portions of the copy master carrying the information to be detected. The detection means further comprises a receiver on the other side of the copy master for receiving the light transmitted through the lateral edge. This realization of the detection means is simple in design and is functionally reliable.

The light source may, for example, consist of a light emitting diode. In the support surface of the guide element, at least one diaphragm opening may be provided, which blocks out all of the light transmitted through the lateral portion of the copy master but that part of light passing through the diaphragm opening. In this manner, for example, the track carrying the DX code may be selected. To be able to read or detect this information, optical means are provided in succession in the path of light, which conduct the light having passed through the diaphragm opening to the receiver.

The diaphragm opening in the support surface may be in the form of an elongated hole extending essentially parallel to the longitudinal direction of the lateral wall guiding the lateral edge of the copy master. Adjacent to the receiver and, with regard to the path of light, in front of the receiver, another diaphragm is located. This latter diaphragm is provided with a diaphragm slit extending transversely to the image of the elongated hole, thereby blocking out all but a part of the light coming from the optical means and releasing only this part of light onto the receiver. In this manner, only in the area in which the diaphragm slit intersects the image of the elongated hole does the light arrive through the diaphragm slit onto the receiver; for example, the receiving surface of a photodiode. In this fashion individual areas of the track defined by the elongated diaphragm hole may be selected. For example the individual bars of a bar code may be selected and read.

Correspondingly, for two-track codes, comprising for example a cycle track and a data track, two parallel elongated holes may be provided in the support surface. The lateral distance of the elongated holes from each other approximately corresponds to the spacing of the data track from the cycle track, along which the information (cycle and data) are applied to the lateral portion of the copy master. In this case, the diaphragm is provided in the vicinity of the receiver with, for example, two diaphragm slits located coaxially relative to each other and transverse to the image of the respective elongated hole, said holes selecting the individual bars of the track concerned.

In another embodiment of the invention the optical means passing the light transmitted by the copy master to the receiver includes one or a plurality of optical conductors, in particular optical fibers or bundles of optical fibers. The light receiving ends are located near the copy master and the light emitting ends are located in the vicinity of the receiver. In this manner again, the light transmitted by the copy master may be guided simply and safely to the receiver.

BRIEF DESCRIPTION OF THE DRAWINGS

Other objects and advantages of the present invention will become more apparent from the following detailed description of preferred embodiments when read in conjunction with the accompanying drawings, wherein like elements are represented by like numerals and wherein.

DETAILED DESCRIPTION OF THE PREFERRED EMBODIMENTS

Figure 1:
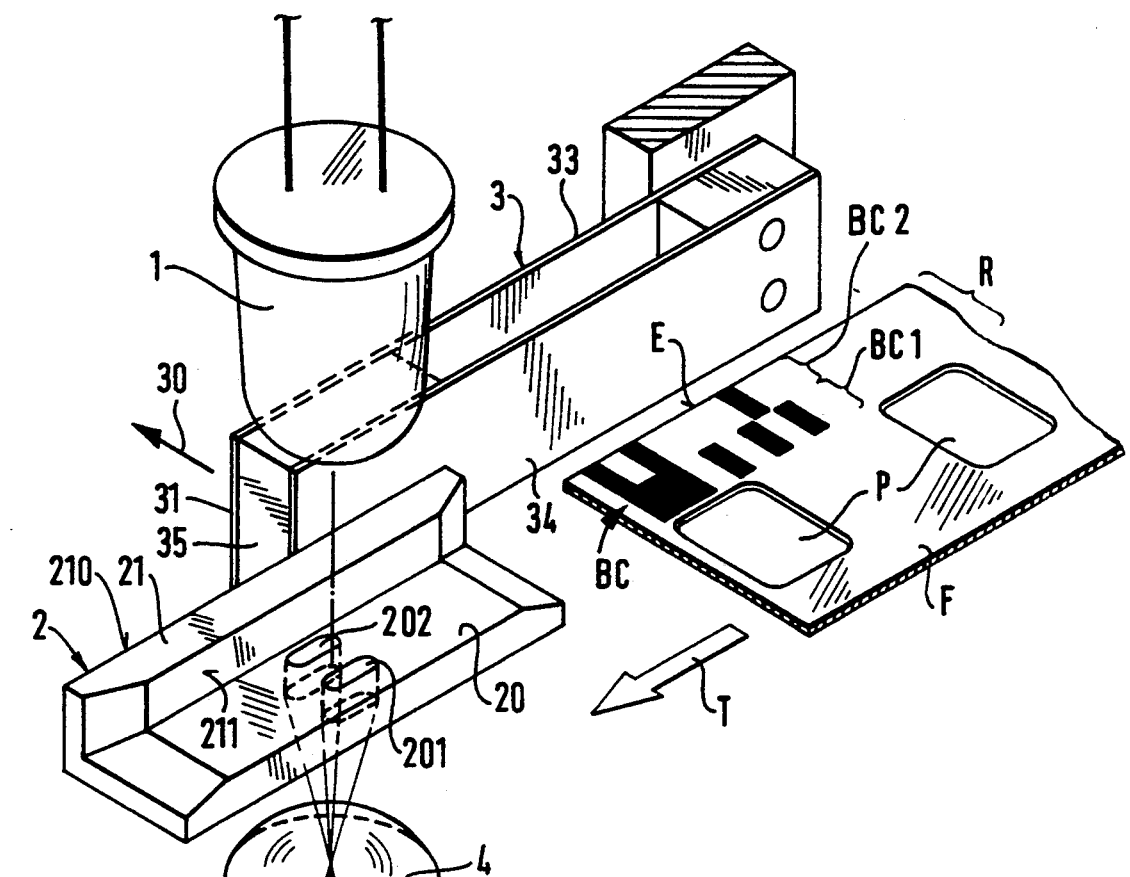
FIG. 1 shows an exemplary embodiment of a guide apparatus according to the invention in a perspective view.

The exemplary embodiment shown in FIG. 1 of an apparatus according to the invention essentially comprises a light source in the form of a light diode 1, guide elements 2 connected with a plate spring 3 for guiding the copy master F, (wherein for the sake of clarity, only one of the guide elements is shown), together with optical means in the form of imaging optics 4, which conduct the light transmitted by the copy master F to a receiver 5, in the vicinity whereof a diaphragm 6 is located in the light path.

The copy master, always represented in the following explanation by a film or a film strip F, is transported according to the arrow T by means of transport devices, (not shown) such as conventional transport rolls. The film F arrives in the course of its transport at two guide elements 2 (FIG. 2) of which, for the sake of clarity, only one is shown in FIG. 1. Each of the guide elements 2 comprise a support surface 20 arid a lateral wall 21 at the outer surface whereof it is connected with the free end of the plate spring 3. The plate spring is stationarily mounted at its other end. The inner surface 211 of the lateral wall 21 guides the lateral edge E of the film F.

As seen in FIG. 1, a two-track bar code BC (DX code) is applied to the lateral portion R of the film F. The inner track BC1 generates the reading cycle for the information (data) contained in the outer track BC2. If the film F arrives in the area of the guide elements 2, the lateral portion R is exposed to light from the light diode 1. In the transparent (bright) areas of the individual tracks BC1 and BC2 the light is able to penetrate through the film F, but not in the non-transparent (dark) areas. The light transmitted by the lateral edge R passes through elongated holes 201 and 202 provided separately for each track BC1 and BC2 in the support surface 20 of the guide element 2, said elongated holes acting as a diaphragm opening. In the continuing light path, image optics 4 are located to guide the light passing through the elongated holes 201 and 202 to the receiver 5. Another diaphragm 6 is located in the light path in the vicinity of the receiver 5, said diaphragm 6 being provided with two diaphragm slits 61 and 62. The diaphragm slits 61 and 62 are coaxial with each other and extend transverse to the image 201a and 202a of the elongated holes 201 and 202. (In principle, only one continuous slit could be provided in place of the two coaxial slits 61 and 62). In this manner the slits 61 and 62 block out all light coming from image 201a and 202a but the shaded area 201e and 202e. Only the light incident onto the areas 201e and 202e may penetrate through the slits 61 and 62 and expose the active surfaces 51 and 52 of the receiver 5. The receiver may consist, for example, of individual photodiodes or an array of photodiodes.

Figure 2:
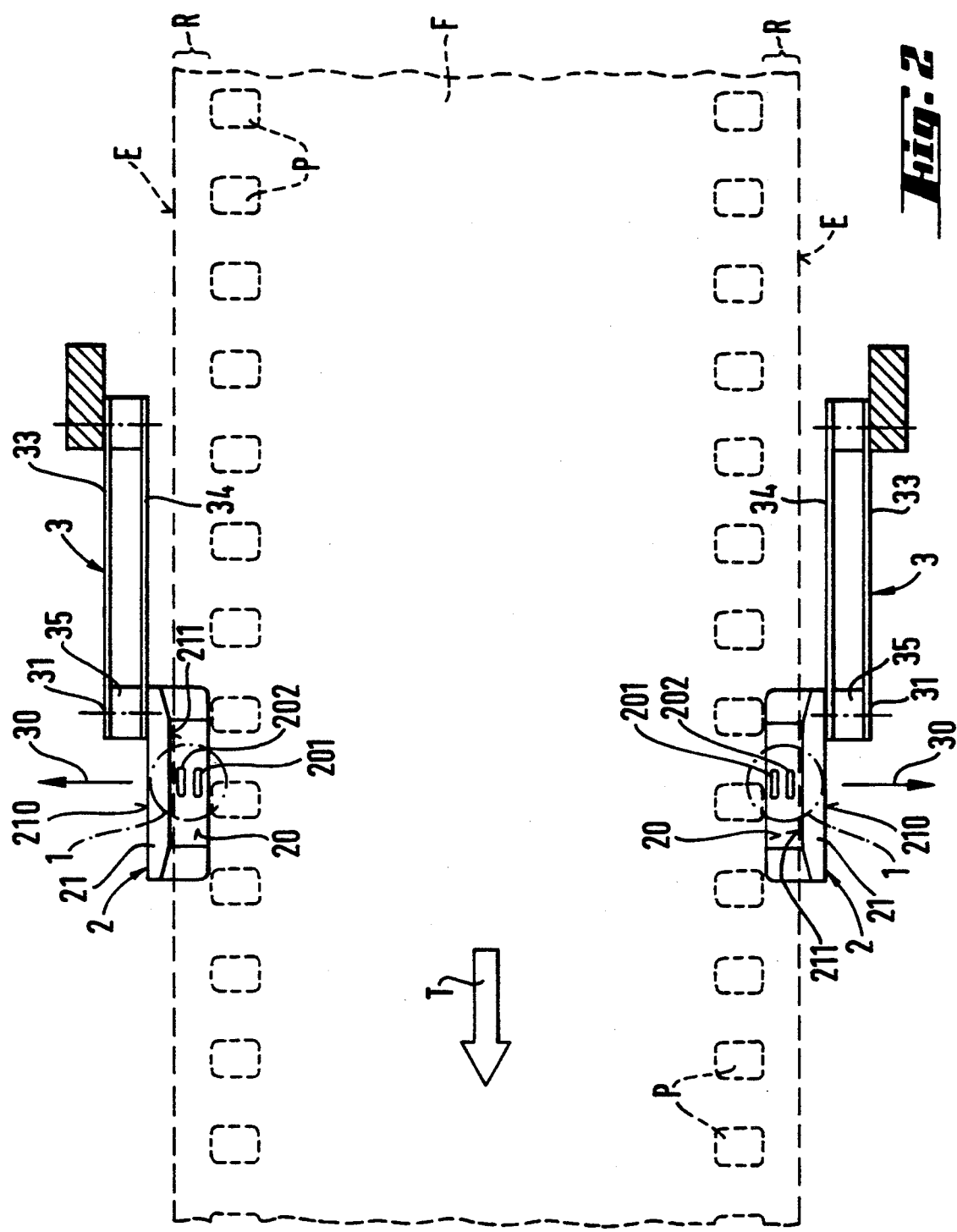
FIG. 2 shows a top elevation of the exemplary embodiment of FIG. 1.

It is seen in the top elevation of FIG. 2 how the film F shown by broken lines is being guided by the guide elements 2 at its lateral edges E. If fluctuations of the width of the film F occur, the lateral edges E of the film F press stronger against the inner walls 211 of the lateral walls 21 of the guide elements 2. The moving end 31 of the plate spring 3, to which the guide elements 2 are fastened, is thereby pressured outward in the direction of the arrow 30, laterally to the transport direction T in the plane of the master. To insure that the inner walls 211 of the lateral walls 21 are extending parallel to the transport direction in spite of this lateral offset and are able to guide the lateral edges of the film F, the plate spring 3 consists of two spring leaves 33 and 34, between which, at the mobile end 31, a cup shaped supporting body 35 is provided. As the distance of the bar code tracks BC1 nd BC2 relative to the lateral edge E of the film always remains approximately constant, the elongated holes 201 and 202 must also maintain the same distance to the lateral edge E, so that the lateral portion R of the film may continue to be penetrated by light only in the area of the tracks BC 1 and BC2. This is obtained by the lateral mobility of the guide elements 2 as described as an example above. The diameter of the light diode 1 (FIG. 1 ) and of the light impacting the lateral portion R of the film F, is large enough relative to the width and distance of the bar code tracks BC1 and BC2 from each other so that if the bar code tracks BC1 and BC2 also deviate in the lateral direction (for example together with the fluctuation of the film width), the DX code is entirely exposed and may be detected. For example, the diameter of the light diode alone amounts to 1 to 5 mm, while the two bar code tracks BC1 and BC2 are spaced apart by only 1.28 mm and have a track width of about 0.5 mm. Obviously, the diaphragm 6 (or its slits 61 and 62) and the receiver 5 (or its active surfaces 51 and 52) are dimensioned so that in case of such lateral fluctuations, the light transmitted through the elongated holes may be readily detected and the DX code read safely. By the location of guide elements 2 at the two lateral edges E of the film F, one need not be concerned, even after rewinding of the film from one core to another as is often done in the practice of photolaboratories, whether the bar code to be read is applied to the right hand lateral portion or the left hand lateral portion R of the film strip F. In this manner the bar code BC is always recognized and read.

Figure 3:
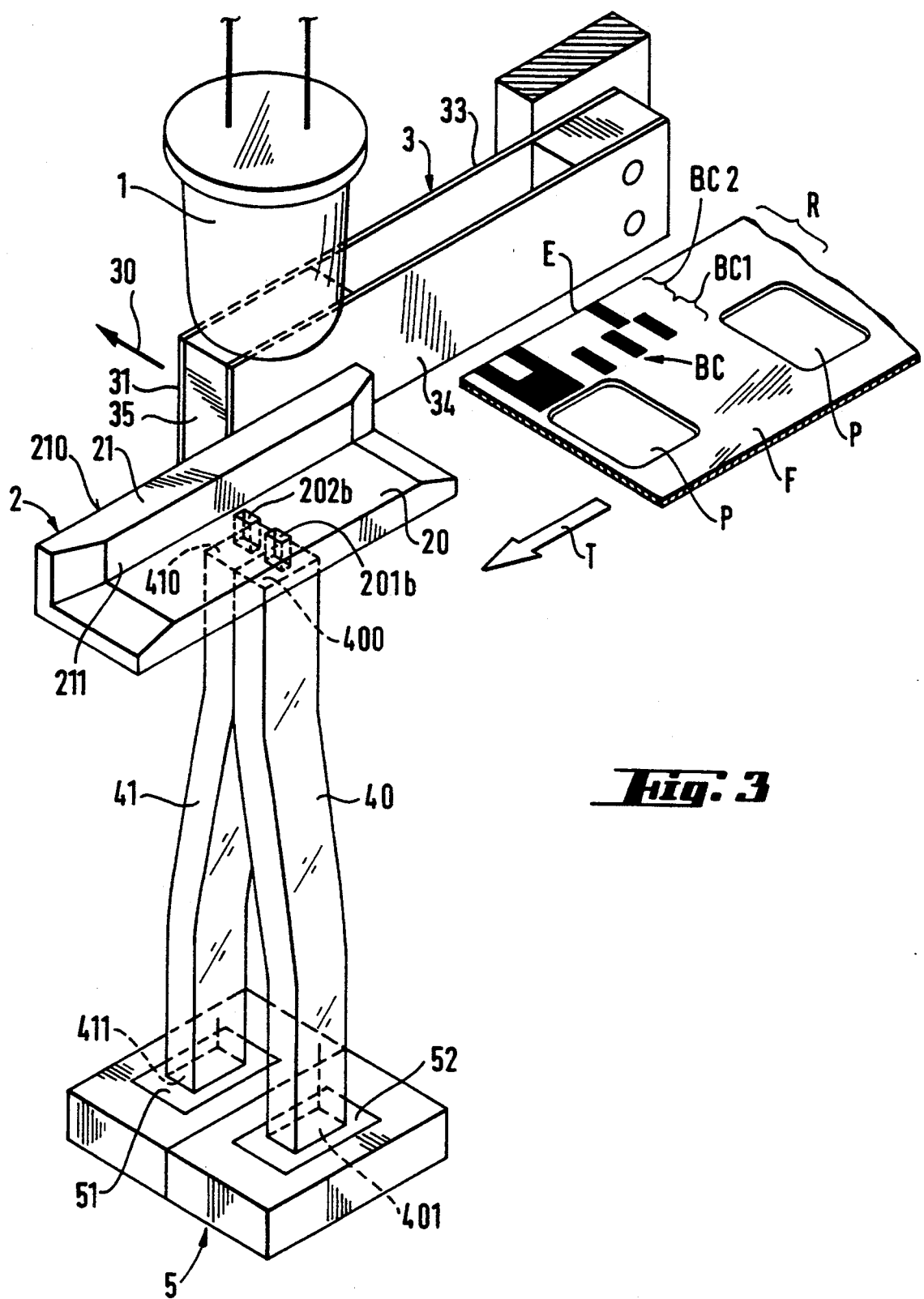
FIG. 3 shows another exemplary embodiment of the apparatus according to the invention.

In the exemplary embodiment shown in FIG. 3 of a guide apparatus, the optical means guiding the light transmitted through the film F to the receiver 4, includes optical conductors, in particular optical fibers or bundles of optical fibers 40 and 41. In this exemplary embodiment, the diaphragm holes, which in the example described above are in the form of elongated holes, are replaced by two narrow slits 201b and 202b, which permit the transmission of the light emitted by the light diode 1 only onto a single element (bar) of the individual track BC1 or BC2 of the bar code. Depending on the more or less strong transmission through this area of the film F (depending on whether a dark or a bright element of the bar code track BC1 or BC2 has been exposed), the light transmitted enters the light receiving ends 400 and 410 of the optical fiber bundles 40 and 41. The light subsequently exits from the light emitting ends 401 and 411 located in the immediate vicinity of the receiver 4, so that the light may impact the active surfaces 51 and 52 of the photoreceiver 5 directly. In this layout, the light passing through the slit 202b impacts the receiver surface 51, and the light passing through the slit 201b impacts the receiver surface 52 (in contrast to the apparatus shown in FIG. 1). The optical conductors in the form of optical fiber bundles are dimensioned so that the light passing through the slits 201b and 202b safely enters the optical fiber bundles 40 and 41. Obviously, the light emitted by light diode 1 could also be conducted by means of optical fibers or bundles of optical fibers to the film F, whereby the film F may be exposed accurately in the area of the element of the bar code BC to be measured. In a practical exemplary embodiment of an apparatus according to the invention, for example, two measured values are determined for each individual area of the bar code (for each individual bar), to provide a high degree of safety in reading the data contained in one of the two tracks BC1 and BC2 in the coded form.

Further variants of the exemplary embodiments of the inventive guide apparatus will be readily apparent to those skilled in the art. For example, in place of the spring elastic adjustability of the guide elements, they may also have a configuration such that shortly before reaching the guide elements 2, the width of the film is detected and the guide elements 2 adjusted in an electronically controlled manner, for example, by means of an electronically controlled electric motor. Furthermore, for example, in the exemplary embodiment with the optical fibers, the diaphragm effect of the holes or slits 201b and 202b may be eliminated by suitably choosing the layout of the light emitting ends of the optical fibers leading to the film F and that of the light receiving end of the optical fibers leading away from the film F, so that they take over the diaphragm function, and many others.

As mentioned above, the guide apparatus is especially suitable for use in photographic printers wherein positive or negative films or film strips are processed. However, it is also suitable for other types of copy masters, particularly single masters, where information is applied to the edge of the copy master, for example, in the form of a bar code. The safe reading of the bar code is assured by means of this apparatus, even if the width of the copy master fluctuates. In addition, intolerable synchronization variations are avoided in processing. Finally, damage to the copy master by arching (deformation of the master) and increased wear of the guide by the friction of the edges are prevented.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Guide apparatus for a photographic copy master comprising:
   transport means for transporting the copy master, said transport means defining a transport plane of the copy master and further including:
   guide elements having lateral walls essentially perpendicular to the transport plane of the copy master and approximately parallel to a direction of copy master transport for guiding the copy master at its lateral edges, said lateral walls being laterally movable relative to the transport direction of the copy master in the plane of transport;
   detection means to detect information applied to the copy master near its lateral edges;

a plate spring having a free end connected with at least one of said lateral walls, said at least one lateral wall being movable laterally against a reset force of the plate spring;

a support surface for supporting a lateral portion of the copy master, the lateral walls being approximately perpendicular to and connected with said support surface;

at least one diaphragm hole for blocking out all of the light transmitted through the lateral portion of the copy master but that part of the light passing through the diaphragm hole; and optical means located in a light path of said light transmitted through the lateral portion of the copy master for conducting the light having passed through the diaphragm hole.

2. Guide apparatus according to claim 1, wherein the detection means further comprises:

a light source for exposing with light the lateral edges of the copy master to which the information to be detected is applied; and a receiver located at another side of the copy master opposite said light source for receiving light transmitted through at least one lateral edge of the copy master.

3. Guide apparatus according to claim 2, wherein the diaphragm hole is located in the support surface of the guide element and is formed as an elongated hole extending essentially parallel to a longitudinal direction of the lateral walls guiding lateral edges of the copy master, said guide apparatus further including:

another diaphragm located in a vicinity of the receiver and the path of light in front of the receiver, said another diaphragm having a diaphragm slit extending transverse to an image of the elongated hole for blocking out part of the light coming from the optical means and releasing it to the receiver.

4. Guide apparatus according to claim 3 wherein the diaphragm hole of the support surface includes:

two parallel elongated holes separated by a lateral distance from each other which approximately corresponds to a spacing of two tracks along which the information is applied to a lateral portion of the copy master, and said another diaphragm provided in the vicinity of the receiver further includes:

two diaphragm slits located coaxial relative to each other and transverse to the image of the respective elongated hole.

5. Guide apparatus according to claim 2, wherein the optical means for conducting the light to the receiver further includes: an optical conductor having optical fibers or bundles of optical fibers, a light receiving end or ends of said optical fibers being located near the copy master, and a light emitting end or ends of said optical fibers being located near the receiver.

6. Guide apparatus according to claim 1, wherein the diaphragm hole in the support surface of the guide element is formed as an elongated hole extending essentially parallel to a longitudinal direction of the lateral wall guiding a lateral edge of the copy master, said guide apparatus further including:

another diaphragm having a diaphragm slit extending transverse to an image of the elongated hole for blocking out all but a part of the light coming from the optical means.

7. Guide apparatus according to claim 1, wherein the optical means further includes:

an optical conductor having optical fibers or bundles of optical fibers, a light receiving end or ends of said optical fibers being located near the copy master.

8. Guide apparatus for a photographic copy master comprising:

transport means for transporting the copy master, said transport means defining a transport plane of the copy master and further including:

guide elements having lateral walls essentially perpendicular to the transport plane of the copy master and approximately parallel to a direction of copy master transport for guiding the copy master at its lateral edges, said lateral walls being laterally movable relative to the transport direction of the copy master in the plane of transport;

detection means to detect information applied to the copy master near its lateral edges;

a plate spring having a free end connected with at least one of said lateral walls, said at least one lateral wall being movable laterally against a reset force of the plate spring;

a support surface for supporting a lateral portion of the copy master, the lateral walls being approximately perpendicular to and connected with said support surface;

a light source for exposing with light the lateral edges of the copy master to which the information to be detected is applied;

a receiver located at another side of the copy master opposite said light source for receiving light transmitted through at least one lateral edge of the copy master;

at least one diaphragm hole for blocking out part of the light transmitted through the at least one lateral edge of the copy master; and optical means located in a light path of said light transmitted through the at least one lateral edge of the copy master for conducting the light blocked out by the diaphragm hole to the receiver.

9. Guide apparatus according to claim 8, wherein the diaphragm hole is located in the support surface and formed as an elongated hole extending essentially parallel to a longitudinal direction of the lateral walls guiding lateral edges of the copy master, said guide apparatus further including:

another diaphragm located in a vicinity of the receiver and the path of light in front of the receiver, said another diaphragm having a diaphragm slit extending transverse to an image of the elongated hole for blocking out part of the light coming from the optical means and releasing it to the receiver.

10. Guide apparatus according to claim 8, wherein the optical means for conducting the light to the receiver further includes:

an optical conductor having optical fibers or bundles of optical fibers, a light receiving end or ends of said optical fibers being located near the copy master, and a light emitting end or ends of said optical fibers being located near the receiver.

11. Guide apparatus for a photographic copy master comprising:

transport means for transporting the copy master, said transport means defining a transport plane of the copy master and further including:

at least one lateral wall essentially perpendicular to the transport plane of the copy master and approximately parallel to a direction of copy master transport for guiding the copy master at its lateral edges, said at least one lateral wall being laterally movable relative to the transport direction of the copy master in the plane of transport;

detection means to detect information applied to the copy master near at least one of its lateral edges;

a spring having a free end connected with said at least one lateral wall, said at least one lateral wall being movable laterally against a reset force of the spring;

a support surface for supporting a lateral portion of the copy master and having at least one diaphragm hole for transmitting light through atleast one lateral edge of the copy master; and optical means located in a light path of said light transmitted through the at least one lateral edge of the copy master for conducting the transmitted light to a receiver.

12. Guide apparatus according to claim 11, wherein the support surface for supporting a lateral portion of the copy master is approximately perpendicular to and connected with said at least one lateral wall.

13. Guide apparatus according to claim 11, wherein the detection means further comprises:

a light source for exposing with light the lateral edges of the copy master to which the information to be detected is applied, said receiver being located at another side of the copy master opposite said light source for receiving light transmitted through said at least one lateral edge of the copy master.

* * * * *